(12) United States Patent
Kalia et al.

(10) Patent No.: US 7,533,102 B2
(45) Date of Patent: May 12, 2009

(54) METHOD AND APPARATUS FOR CONVERTING LEGACY PROGRAMMING LANGUAGE DATA STRUCTURES TO SCHEMA DEFINITIONS

(75) Inventors: Suman K. Kalia, Maple (CA); Sheng Fang, Toronto (CA); John H. Green, Toronto (CA)

(73) Assignee: International Business Machiens Corporation, Armonk, NY (US)

( * ) Notice: Subject to any disclaimer, the term of this patent is extended or adjusted under 35 U.S.C. 154(b) by 1239 days.

(21) Appl. No.: 10/324,742

(22) Filed: Dec. 18, 2002

(65) Prior Publication Data
US 2004/0044678 A1    Mar. 4, 2004

(30) Foreign Application Priority Data
Aug. 29, 2002    (CA) .................................. 2400590

(51) Int. Cl.
*G06F 7/00*    (2006.01)
*G06F 9/44*    (2006.01)
(52) U.S. Cl. ...................... 707/100; 707/10; 717/118; 717/136
(58) Field of Classification Search ...... 707/100–104.1, 707/3, 10, 1; 715/513; 717/100, 104, 136, 717/140–146, 107, 173, 118
See application file for complete search history.

(56) References Cited

U.S. PATENT DOCUMENTS

| | | | | |
|---|---|---|---|---|
| 5,836,014 A * | 11/1998 | Faiman, Jr. ................. 717/156 |
| 5,915,259 A * | 6/1999 | Murata ....................... 715/513 |
| 6,003,039 A * | 12/1999 | Barry et al. ............. 707/103 R |
| 6,094,688 A * | 7/2000 | Mellen-Garnett et al. ... 719/328 |
| 6,151,624 A * | 11/2000 | Teare et al. .................... 707/5 |
| 6,151,702 A * | 11/2000 | Overturf et al. ............. 717/136 |
| 6,233,542 B1 * | 5/2001 | Butts et al. .................... 703/27 |
| 6,253,366 B1 * | 6/2001 | Mutschler, III ............. 717/104 |
| 6,301,584 B1 * | 10/2001 | Ranger ................... 707/103 R |
| 6,305,007 B1 * | 10/2001 | Mintz ............................ 707/1 |
| 6,313,834 B1 * | 11/2001 | Lau et al. ..................... 715/803 |
| 6,332,163 B1 | 12/2001 | Bowman-Amuah |
| 6,449,619 B1 * | 9/2002 | Colliat et al. ............... 707/102 |
| 6,453,464 B1 * | 9/2002 | Sullivan ...................... 717/137 |

(Continued)

FOREIGN PATENT DOCUMENTS

EP    WO 01/67290 A2 *    9/2001

OTHER PUBLICATIONS

Power et al.—"Program Annotation in XML: A Parse-tree Based Approach"—IEEE Xplore 2002 (pp. 1-9).*

(Continued)

*Primary Examiner*—John E Breene
*Assistant Examiner*—Anh Ly
(74) *Attorney, Agent, or Firm*—Yee & Associates, P.C.; Herman Rodriguez

(57) ABSTRACT

A method and apparatus for creating a schema definition from a language-specific metamodel of a data structure written in a legacy computer language involves walking through the nodes of the metamodel, and creating corresponding schema element objects in a schema tree that is serialized to create the schema definition. The creation of the schema element objects follows rules, and permits the definition of nested data structures having conjunctive-type and disjunctive-type membership.

17 Claims, 4 Drawing Sheets

U.S. PATENT DOCUMENTS

| | | | |
|---|---|---|---|
| 6,466,240 B1* | 10/2002 | Maslov | 715/234 |
| 6,549,898 B1* | 4/2003 | Inaba et al. | 707/5 |
| 6,631,519 B1* | 10/2003 | Nicholson et al. | 717/169 |
| 6,643,825 B1* | 11/2003 | Li et al. | 715/205 |
| 6,654,784 B1* | 11/2003 | Wei | 709/203 |
| 6,665,662 B1* | 12/2003 | Kirkwood et al. | 707/3 |
| 6,687,873 B1* | 2/2004 | Ballantyne et al. | 715/500 |
| 6,738,967 B1* | 5/2004 | Radigan | 717/146 |
| 6,738,975 B1* | 5/2004 | Yee et al. | 719/310 |
| 6,760,734 B1* | 7/2004 | Stephens | 707/102 |
| 6,782,540 B1* | 8/2004 | Chow et al. | 719/316 |
| 6,789,251 B1* | 9/2004 | Johnson | 717/100 |
| 6,856,985 B1* | 2/2005 | Pierce et al. | 707/1 |
| 6,985,910 B2* | 1/2006 | Hollingsworth | 707/102 |
| 6,993,745 B1* | 1/2006 | Ballantyne et al. | 717/109 |
| 7,111,233 B1* | 9/2006 | Ballantyne et al. | 717/107 |
| 7,114,147 B2* | 9/2006 | Ballantyne et al. | 717/107 |
| 2001/0044811 A1* | 11/2001 | Ballantyne et al. | 707/513 |
| 2002/0059566 A1* | 5/2002 | Delcambre et al. | 717/146 |
| 2002/0078010 A1* | 6/2002 | Ehrman et al. | 707/1 |
| 2002/0085020 A1* | 7/2002 | Carroll, Jr. | 717/100 |
| 2002/0107889 A1* | 8/2002 | Stone et al. | 707/100 |
| 2002/0143742 A1* | 10/2002 | Nonomura et al. | 707/1 |
| 2002/0147745 A1* | 10/2002 | Houben et al. | 707/513 |
| 2003/0055806 A1* | 3/2003 | Wong et al. | 707/1 |
| 2003/0098893 A1* | 5/2003 | Makinen | 345/853 |
| 2003/0115548 A1* | 6/2003 | Melgar | 715/513 |
| 2003/0120651 A1* | 6/2003 | Bernstein et al. | 707/6 |
| 2003/0121001 A1* | 6/2003 | Jeannette et al. | 715/513 |
| 2003/0131338 A1* | 7/2003 | Georgalas | 717/104 |
| 2003/0145316 A1* | 7/2003 | McKinlay et al. | 717/173 |
| 2003/0149934 A1* | 8/2003 | Worden | 715/513 |
| 2003/0167254 A1* | 9/2003 | Su et al. | 707/1 |
| 2003/0182278 A1* | 9/2003 | Valk | 707/3 |
| 2003/0191970 A1* | 10/2003 | Devine et al. | 713/201 |
| 2003/0204511 A1* | 10/2003 | Brundage et al. | 707/100 |
| 2004/0221292 A1* | 11/2004 | Chiang et al. | 719/310 |
| 2005/0027681 A1* | 2/2005 | Bernstein et al. | 707/1 |
| 2005/0039173 A1* | 2/2005 | Tondreau et al. | 717/136 |
| 2005/0060306 A1* | 3/2005 | Hattori et al. | 707/3 |
| 2005/0114763 A1* | 5/2005 | Nonomura et al. | 715/513 |

OTHER PUBLICATIONS

Cheney et al. "XParse: A Language for Parsing text to XML"—ACM 2002—(pp. 1-10).*

NN9201272, Jan. 1992, IBM_TDB.*

"Wrapping Legacy COBOL Programs Behind an XML-Interface"—Harry M. Sneed,—IEEE 2001 (papas 189-197).*

"Control Flow Normalization for COBOL/CICS Legacy Systems"—Brand et al., IEEE 1998 (Mar. 8-11, 1998) (pp. 11-19 (1-9)).*

IBM Systems Journal, Developing XML Web services with WebSphere Studio Application Developer, by C. Lau et al, vol. 41, No. 2, 2002, pp. 78-96.

* cited by examiner

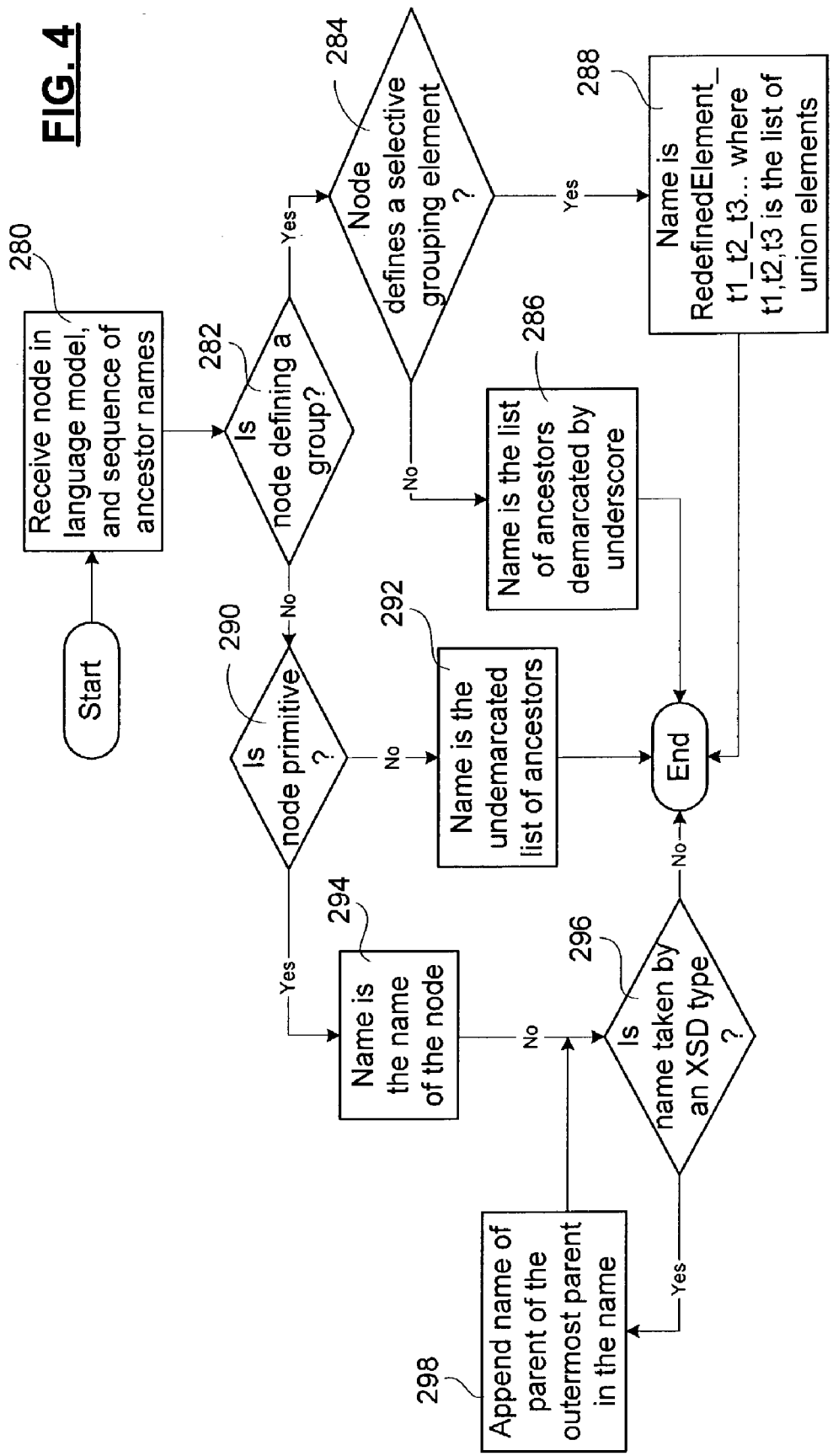

METHOD AND APPARATUS FOR CONVERTING LEGACY PROGRAMMING LANGUAGE DATA STRUCTURES TO SCHEMA DEFINITIONS

CROSS-REFERENCE TO RELATED APPLICATIONS

This is the first application filed for the present invention.

MICROFICHE APPENDIX

Not Applicable.

TECHNICAL FIELD

The invention relates to markup languages, and, in particular, to a method for converting definitions of data structures written in legacy programming languages into schema definitions written in a markup language.

BACKGROUND OF THE INVENTION

Markup languages have been developed for describing parameters used in support of operations, and the operations themselves, using an abstract grammar that is independent of any particular programming language or environment in which the operations may be performed. These descriptions have been found to be useful in a number of situations. For example, a description of computer functionality in a language-neutral and environment-neutral format is useful for characterizing the computer functionality of different programs written in different languages for different environments. Moreover, language-neutral and environment-neutral descriptions of computer functionality can be used to enable co-operation of the different programs written in different languages, for different environments. Data structures are an important aspect of computer functionality. While primitive data structures (data types) are relatively easily mapped to respective primitive data structures of markup languages, nested data structures also need to be expressed in the markup language.

An example of a current markup language endorsed by the World-Wide Web consortium (W3C), is extensible markup language (XML). XML is further associated with a schema definition language (XSD) that provides for the definitions of schemata. A schema definition is used by XML message senders to transmit an instance of a data structure as a flat XML message using an XML tagged message format. The tagged message is used by XML message receivers to reconstruct the data structure from the tagged name-value pairs.

Canonical mappings exist between XML and java, visual basic and other languages currently used for developing web applications, including the mappings for data structures. However, legacy computer applications, written in Cobol, C or PL/I, for example, which have been developed for many years at great expense, have not been provided with mapping algorithms. The legacy applications are reliable, but, as the term "legacy" denotes, they are not adapted to be executed by current computing platforms. One particular type of a legacy computer system is a customer information control system (CICS). CICSs are online transaction processing programs for building customer transaction applications in mainframe computing environments. Much of CICS programming is written in the COBOL programming language. Consequently a great number of legacy applications still in use are written in COBOL. Similarly the C programming language has been very popular and has been used to create a lot of computer functionality that drives today's business operations.

What is therefore needed is an automated process for describing legacy data structures using a markup language. In particular, a method and apparatus for constructing schemata corresponding to the data structures created using legacy computer languages. A value latent in legacy computer applications, and an opportunity to part those application to various computing environment and programming language-agnostic services, underscores the need to provide the method for generating schema definitions required to define those services.

SUMMARY OF THE INVENTION

It is therefore an object of the invention to provide a method and apparatus for converting data definitions extracted from programs written in a legacy computer programming language into schema definitions written in a markup language.

The invention therefore provides a method for generating a schema definition. The method comprises a first step of receiving a language-specific metamodel generated from a nested data structure definition written in a predetermined legacy computer language. After the metamodel is received, a complex type schema element is defined and named for the nested data structure. The schema definition is then created by walking through the metamodel and examining each node in the metamodel, and for each node, creating a respective schema element according to a predefined mapped relationship.

The invention further provides an apparatus for generating a schema definition from a definition of a nested data structure written in a legacy computer language. The apparatus comprises an interface through which a language-specific metamodel generated from the nested data structure definition is received. The apparatus further includes a naming resource that generates names for schema elements derived from names of corresponding nodes of the language-specific metamodel, and a data control system for walking through the nodes of the metamodel. A mapping module of the apparatus is adapted to receive nodes, inspect their content, and generate a corresponding part of a schema definition to produce a schema definition for the nested data structure.

The invention further provides a computer-readable medium containing program instructions for generating a schema definition. The program instructions comprise instructions for receiving a language-specific metamodel generated from a nested data structure definition written in a predetermined legacy computer language. Instructions are also provided for naming and defining a complex type schema element for the nested data structure, and creating the schema definition by walking through the metamodel to examine each node in the metamodel. For each node, the program instructions create a respective schema element according to a predefined mapped relationship.

The invention therefore permits the functionality of legacy computer programs and legacy computer applications to be ported to a web services platform. Trusted applications can therefore be re-used in a modern computing environment to reduce application development costs and improve time to market.

BRIEF DESCRIPTION OF THE DRAWINGS

Further features and advantages of the present invention will become apparent from the following detailed description, taken in combination with the appended drawings, in which:

FIG. 4 illustrates principal steps in deriving a name for a schema element in accordance with one naming convention for use in accordance with the present invention.

It will be noted that throughout the appended drawings, like features are identified by like reference numerals.

DETAILED DESCRIPTION OF THE PREFERRED EMBODIMENT

The invention provides a method for creating schema definitions for data structures defined in legacy computer languages. The created schemata can be used with a markup language (preferably, extensible markup language (XML)) to characterize legacy computer language data structures, which may be used for various purposes, including cataloging computer functionality in a language and environment-independent manner, and porting legacy computer applications to distributed processing systems. The schemata generated using the method and apparatus in accordance with the present invention may be generated using the XML schema definition (XSD) language.

The invention will be described with reference to an embodiment that is designed to function as a component in a larger system for characterizing computer functionality, but this is not representative of all applications of the methods and apparatus in accordance with the invention.

Environment

Figure 1:
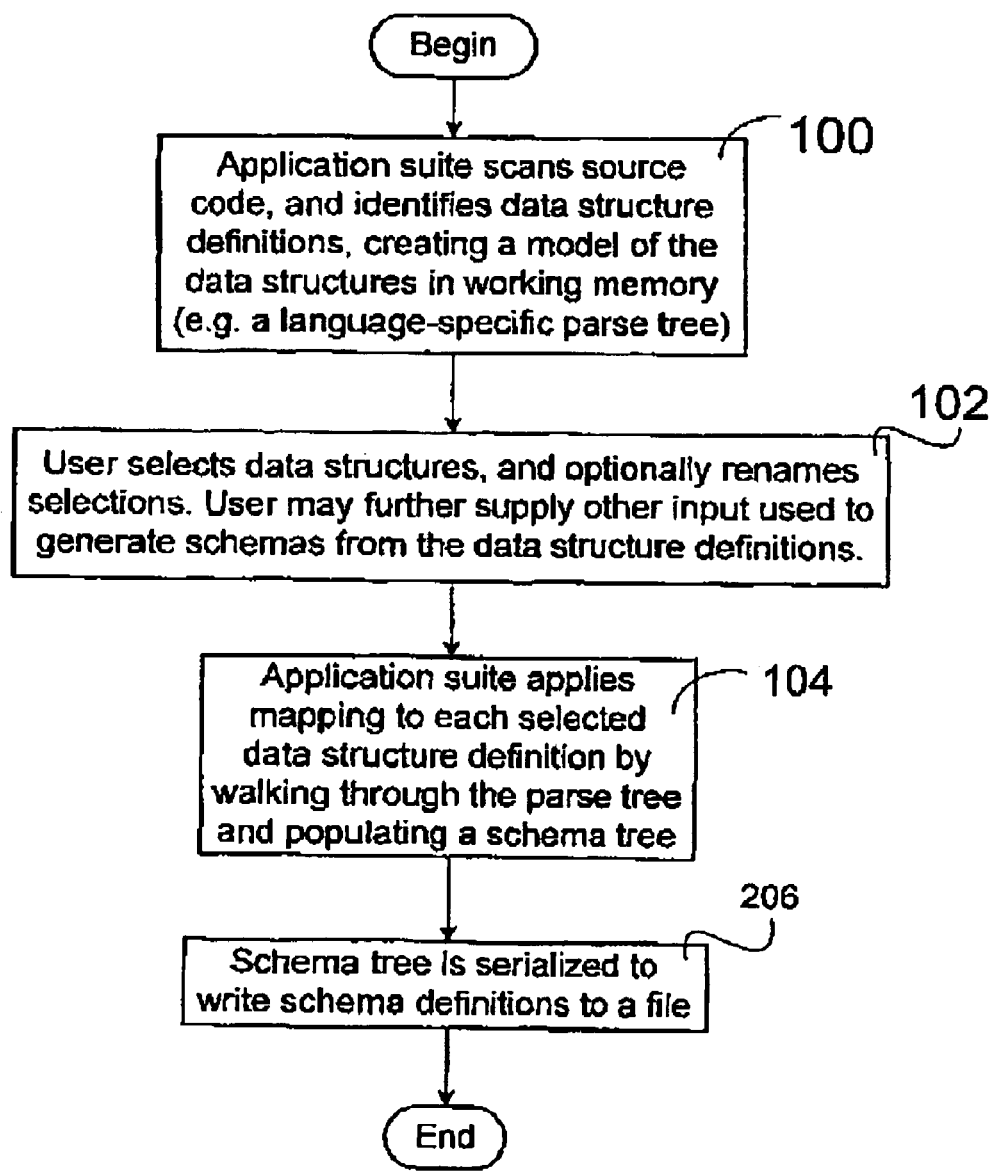
FIG. 1 illustrates principal steps involved in creating a schema using an exemplary user interface in accordance with the invention.

FIG. 1 schematically illustrates a method for using the invention, and provides a control environment for executing programs, that effect the generation of XSD schemata. The control environment comprises a suite of tools, graphical user interface (GUI), and applications, etc. that are used to create the characterization of the legacy computer functionality in a markup language.

The method begins when the application suite is presented with source code written in a determined legacy language. In step 100, the source code is scanned, and data structures identified. This identification of data structures may be effected by a software tool that reduces the source code to an in-memory language-specific metamodel. Each computer language that the suite is adapted to receive and parse requires a respective language-specific metamodeling tool for this purpose. The language-specific metamodel is a structured representation of the source code that facilitates numerous operations, including the identification of the data structures. The structured representation of a source code stored in working memory provides ready access to the data structures, as well as their elements, sub-elements, etc., and is associated with a method for perusing ("walking through") the parts of the structured representation that correspond to respective data structure definitions. In accordance with the present embodiment, the parts of the structured representation include at least a structure of a parse tree, the nodes (vertices) of which correspond to the elements of the data structure definition, and the edges of which correspond to a membership relation obtained between the elements in accordance with a native interpretation of the data structure definitions.

As the term is used herein, a parse tree is a simple, rooted, connected, directed, acyclic, graph.

Some examples of language-specific metamodels of code written in a legacy computer language, (C, COBOL and PL/I, for example) are described in an Object Management Group (a standards group) document *UML Profile and Interchange Models for Enterprise Application Integration (EAI) Specification* (sections 14.1-14.3), the contents of which are hereby incorporated herein. Other representations of legacy computer code that provide enough structure to clearly define the different parts of the computer code needed for generating schema definitions, can also be used. Preferably a structure defined by inclusion of elements of the data structure (which is naturally a tree-like structure) is directly or indirectly evident in any language-specific metamodel of the present invention.

In step 102, the user is presented a GUI that displays a list of all of the data structures defined in the source code. The GUI provides the user with an option of selecting or deselecting any of the data structures, the user may also name or rename any of the selected data structures. Preferably the GUI further permits users to supply input used to govern the construction of the schema definitions. An example of such input and subsequent processing is further illustrated below with reference to FIG. 3.

The user input is received via the GUI and a mapping tool in accordance with the invention is invoked (step 104) to populate a schema tree. The schema tree includes a root node that contains meta information regarding the source code, environment, etc. required for formatting the XSD schema definitions, etc. Each child of the root of the schema tree is an object that serves as a root of a respective schema sub-tree that corresponds to a respective data structure. Each schema sub-tree is created by an iterative process of populating nodes. This process is further described below with reference to FIG. 2.

After the schema tree is constructed, every object of each schema definition is defined, and a process of serializing the schema tree structure to form schema definitions is performed (step 206). The result of the serialization is a file that expresses the schema definitions in a file, rather than the in-memory schema tree structure. Examples of serialization processes are well known in the art. Although "serialization" is sometimes used in related arts to refer to marshalling (the formatting of data into a data stream in a manner that permits recovery of the data at a receiving end), the way in which the term is used in this document will be clear to those of skill in the art.

Method

Figure 2:
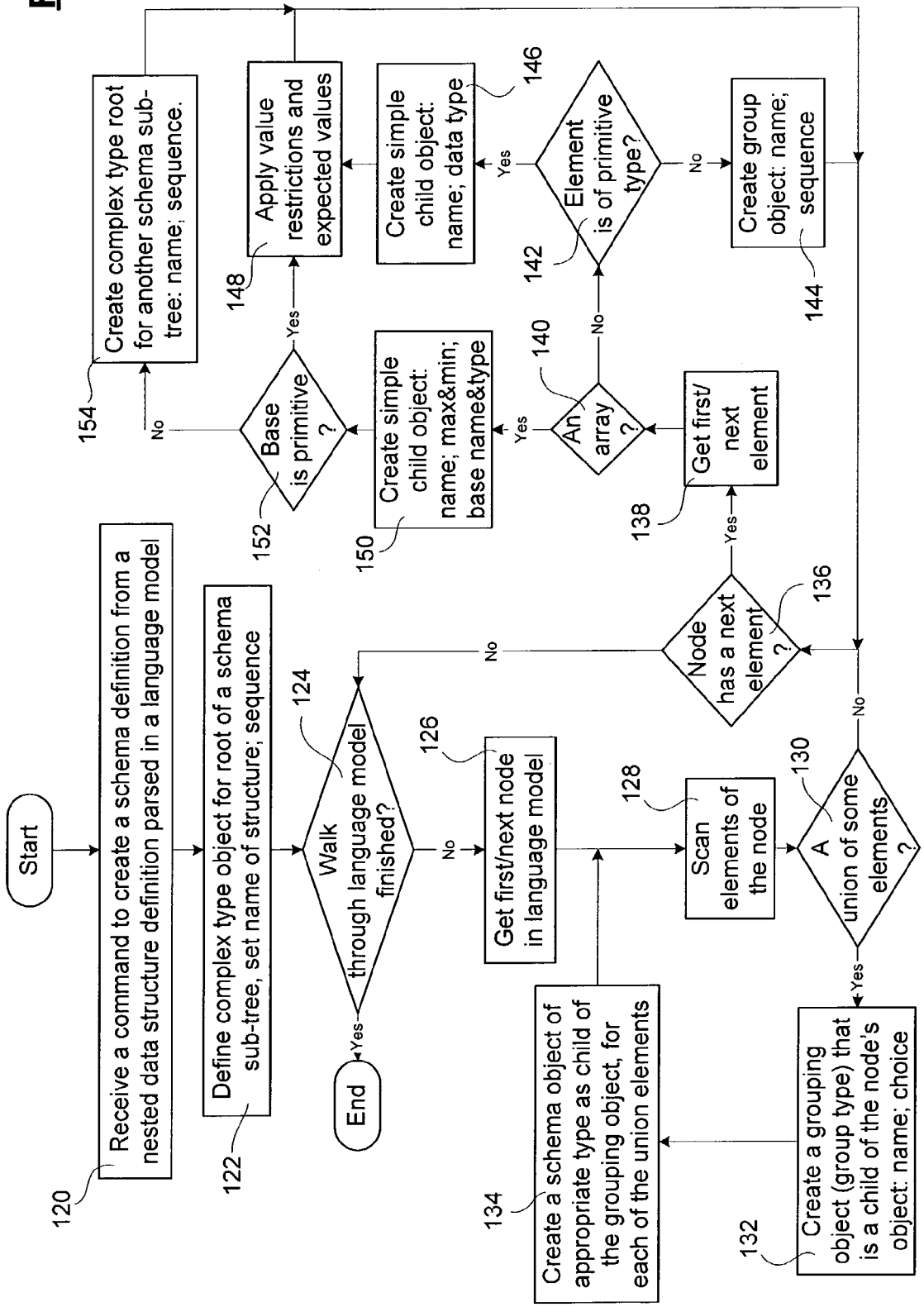
FIG. 2 illustrates principal steps involved in generating a schema definition in accordance with an embodiment of the invention.

FIG. 2 schematically illustrates principal steps involved in mapping a part of the language model that is stored in memory for immediate reference. In step 120, the mapping tool is invoked, and a part of the language-specific metamodel corresponding to one of the data structures definitions that has been selected by a user is located. The procedure begins by defining a root object (122) for the schema sub-tree generated from the data structure, and including it as a child of the root of the schema tree, which is already defined. In accordance with an embodiment, creating a node (such as the root of the sub-tree) involves instantiating an object, which requires specifying a set of attributes that are mandatory for an object of the object's type. The attributes for complex type and group objects are a name and a content model. Simple type objects have a name, and a data type, as mandatory attributes. A complex type object is created in step 122. The name is supplied in the command received in step 120, and the complex type is set by default to "sequence". As will be familiar to those skilled in the art, a content model of such objects is a guide to reading the elements of the object. More particularly, a content model of an object determines whether all the elements of the object are included in every instance of the object, only some are, and if a listed order of the elements is respected by the instances. According to XSD, there are four content models: sequence, choice, all, and any: only the first two are used in embodiments of the present invention. A choice content model indicates that one and only one of the elements are included in an instance of the object, whereas a sequence content model indicates that all of the elements are included in each instance, and that the elements respect an order in which the element names appear in the XSD definition.

After a first node of the scheme sub-tree has been created, a procedure for walking through the language-specific metamodel is begun. If there is a first/next step in the walk through, as determined in step 124, the step is taken (step 126). Otherwise the procedure ends. The first step, naturally takes the procedure to the root of the parse tree in the language model: an image of which is the only node defined in the schema sub-tree thus far. The walk through ensures that the parse tree is traversed, so that every node in the data definition of the language-specific metamodel is examined once and only once. The procedure ensures that steps in the walk through are performed after the corresponding objects of the schema sub-tree have been created. Once a first or next node in the parse tree has been accessed (step 126), a language-specific task is performed to identify elements of the node that are natively interpreted as alternatives in the data structure. Herein the elements of a node that are natively interpreted as alternatives are generically referred to as "union elements". For example in C, a union key word is used to specify that the elements represent alternatives in the data structure. However, in COBOL, a redefines clause is used to provide a second description and name for a data structure in working storage. Either of these names and descriptions can be used to identify the requisite content in the working storage, but only one is required. Consequently, an application of the present invention to COBOL source code requires a search through the elements (step 128) of the node to determine if any redefines clauses appear. Step 128 is not required for detection of union elements in all source code legacy languages.

In step 130 it is determined whether the (current) node contains elements that are union elements. Some legacy computer languages, like COBOL, permit the union of only some of the elements of a node, while others, like C, provide a structure for taking a union of all elements of the node. If it is determined that the node contains union elements, a grouping object is created to represent all of the union elements in the node (step 132). The grouping object is defined by creating a group object supplying a name for the object according to a naming convention (further described below with reference to FIG. 4), and assigning a content model attribute of the group object of "choice". If the union is defined by including all elements of the node in the union (as in C), the name of the grouping object is derived from the name of the node, otherwise a special name like "UnionElement_A_B_C . . . " (where A, B, C . . . are the names of the union elements of the node) may be used. Once the grouping object is defined, schema tree objects (schema elements) for each of the union elements of the node are created (step 134). Each of the union elements is used to create a respective object, in turn, for example using steps described below with reference to steps 140-154. After the union element objects have been created, the procedure returns to step 128, so that if there happens to be a group of multiple union elements, these are treated in turn.

If in step 130 it is determined that no (more) union elements exist, the procedure begins examination of each of the (non-union) elements of the node. If, the node is a union of all its elements, or the node is of primitive type, for example, it will be determined in step 136 that no elements are left in the node. Consequently the process will return to step 124. Otherwise it will be determined, in step 136, that there remains at least one element in the node. In step 138, a first/next element of the node is examined. If the element is not an array (as determined in step 140), it is determined in step 142 whether the element is of a primitive type. If the element is not of primitive type, a child object is created for the current node's schema object, the child object being a group object, having an assigned name, as generated by the naming scheme, and a content model of type sequence is generated (step 144). At this point, the walk through the language model has yet to arrive at this element's corresponding node in the language-specific metamodel. When it does, its respective elements will be defined. With the creation of the object complete, the procedure returns to step 136.

If in step 142 the element is determined to be of primitive type, an object is created as a child of the current node, by instantiating a simple schema element object, setting the name, and assigning a data type for the object (step 146). The procedure advances to step 148 wherein it is determined if any data type restrictions, or expected values are to be applied to the native interpretation of a source code definition of the element. If any data type restrictions (such as a maximum/minimum number of characters etc.) is applied to the native interpretation, these are included by setting an optional restriction base attribute, and expected values (values that have special interpretations, such as a "space" for a default string in COBOL), which are incorporated by inserting an annotation attribute, which is another optional attribute of simple type objects. After the simple type object is created for the primitive element the procedure returns to step 136.

If the element is determined to be an array, in step 140, it is further determined whether the array is of fixed-, or variable-length. Arrays are well known compound data elements that support a number of entries, each being of the same data type. As is known in the art, variable-length arrays can be defined in many legacy languages to have at least a number (min) of elements and at most a number (max) of elements. Of course if the array is of fixed-length, min=max. Most legacy computer languages support arrays of data structures. Consequently, a simple object is created as a child of the node's object in the schema sub-tree (step 150) by defining a simple type object. The name for the object is generated, a minimum number of occurrences and a maximum number of occurrences (optional attributes of the simple object) are set to the min and max numbers, and a name of the base of the array is inserted. If the base is of primitive type, as determined in step 152, the base type is inserted into the object. Any data type restrictions and/or expected values of the base data type are inserted into the object as the procedure returns to step 148.

Otherwise the base type is a complex structure, and a base type of the base element is set, using a name that is derived from the name of the object by removing underscores which delimit the parent object names in the name. In step 154 a complex type object is created to define the type just instantiated. Therefore the name of the complex type object is the name of the base type. The complex type is of "sequence" content model. When the walk through of the language-specific metamodel reaches a node corresponding to the current element, the active schema element will be the complex type, which serves as a root of a secondary schema sub-tree. It is preferable to create the schema sub-tree as an autonomous schema for structured bases of arrays, to permit use of the complex data type in other applications. Subsequently the procedure returns to step 136. By the end of the walk through, all of the nodes in the part of the language-specific metamodel will have been examined, and at least one schema sub-tree(the principal one) will have been populated with objects that are defined in accordance with the XSD language.

Figure 3:
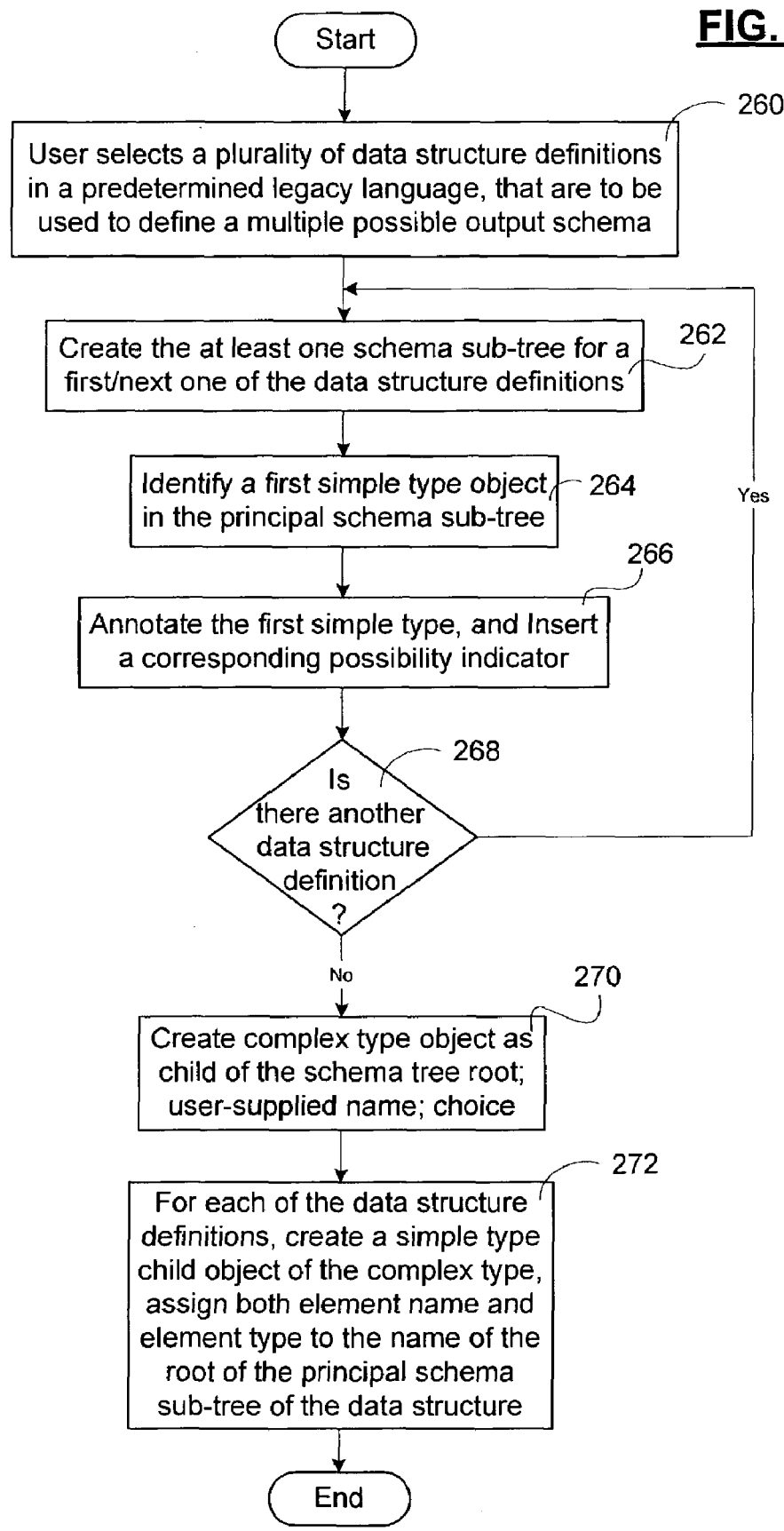
FIG. 3 illustrates principal steps involved in creating multiple possible output-type schemata, in accordance with an aspect of the invention.

Schemata are frequently created to perform a role in a service of some kind, and it is therefore important to provide users with an opportunity to create different kinds of schemata. Once a complex type (a schema sub-tree) has been defined, it can feature as a schema element in other schema definitions. Therefore once the language-specific data structures have been defined as schemata, these can then be used in the creation of other schemata. One particular way of generating schemata that is particularly common is by forming a group of request/response types for a respective action. Such a grouping is similar in many respects to the grouping element discussed above. If a plurality of request/responses are possible at a juncture in a service, a message having a complex type that relates these possibilities is desirable. A method for creating these grouping types is schematically illustrated in FIG. 3.

In step 260, a user selects data structure definitions of the possibilities that are to be used to define the grouping type, and further supplies a name for the grouping type. The method shown in FIG. 2 is applied to a first of the data structure definitions, resulting in the generation of at least a respective principal sub-tree for the first data structure definition. A principal sub-tree of a data structure definition is the sub-tree having a complex type root, which bears the name derived from that of the data structure, unless the user has renamed it, and prior to other schema sub-trees in both an order in which their roots were generated, and an order defined by referencing. For example, when a complex type is defined from an array having a structured base in accordance with the method of FIG. 2, the structured base type refers to the array type, and so the complex type of the array is prior to the structured base type in that sense. Once the schema sub-tree(s) has been defined in step 262, a first simple schema object of the schema sub-tree is identified (step 264). An annotation is inserted into the first simple schema object. The annotation inserts a recognition description pattern that is used to associate the possibility with a reply/request message. The format of the reply/request message depends on the system generating the message, but a tag that is used to identify which of the possibilities the message corresponds to can be reused. In step 268, it is determined whether another user-supplied data structure definition is to be used to define a corresponding schema. If another such data structure definition exists, the procedure returns to step 262. Otherwise, in step 270, a complex type is created for the grouping. As other complex types, it is defined as a child of the root of the schema tree. A name supplied by the user is set as the name of the complex type and the content model is set to "choice". In step 272, a simple type schema element is included in the complex type for each of the data structure definitions. Each simple type schema element has both a name and a type set to a respective one of the already defined schemata.

In accordance with the invention, an automated name-generating procedure is also provided. Rote derivation of names from names of elements of the data structure definitions expedites the method. However, it is a requirement of XSD that no two schema types in the same schema tree be given the same name. Care must therefore be taken to assure uniqueness of each of these names. Furthermore, because of the way in which different nodes of the language-specific metamodel are handled, different structures requiring a name generate different types of names.

In step 280, a name for a schema object is requested. A list of names is provided, the list corresponding to the names of the corresponding element in the language-specific metamodel, and all of its ancestors. In step 282 it is determined whether the element is being used to define a group. If it is, the name is generated by appending the list of ancestors, separated by an underscore ("\_") to the name of the element, unless the group defines a grouping element of the redefines type (determined in step 284). If the grouping element is used for a union of some, but potentially not all, elements of a node, there may not exist a node of the language-specific metamodel from which the object being named is mapped. The absence of a name from a corresponding node in the language-specific metamodel for these group objects is overcome by creating a name of the form UnionElement_t1_t2_t3 . . . , by appending the names of the union elements (t1, t2, t3, . . . ) to "UnionElement", each separated by an underscore.

If the object being named is not a group, it is either a simple type element or a complex type element, as determined in step 290. If the language-specific metamodel node from which the object is being derived is not a simple type, either it is a user-defined name (in which case uniqueness is verified immediately after it is input), or it was generated from an array having a structured base. In the latter case, the name for the array is defined to match the type of the base already inserted. In accordance with the present embodiment, a name for the type is chosen to be the list of ancestors (undemarcated), and consequently so will be the name of the complex type. If needed, prior to assigning the type for the base structure, a candidate word is tested to determine if it is unique. If a name is not unique, and cannot be made to be so using rote procedures, the user is called upon to assign a new name to the object.

Similarly, if the procedure is anonymous, the user is required to supply a name.

If the node from which the object is derived is a primitive type, the name of the node is first chosen for the object (step 294). If the name of the object is found not to be unique step 296 in comparison to all of the other schema type names, a name of the parent of the object is appended using an underscore (step 298), and the procedure returns to step 296.

The way in which a language-specific metamodel of a data structure can be used to create a definition of a substantially identical schema type has been described. As will be appreciated by those of skill in the art, special case treatment may be required for different programming techniques associated with different legacy computer programming languages. For example, COBOL supports level 66, level 77 and level 88 declarations, which have respective native interpretations. The last of these can be of use for providing important interpretation information regarding possible values a field can receive. This information permits insertion of a particular value in dependence on other factors, and definition of the factors in view of a value of the field. As these values are relevant to processing, and are closely related to the native interpretation of data, a means for incorporating the association information into the schema type definition is desired. Accordingly, step 148 of the method of FIG. 2 preferably further involves a step of detecting immediately following level 88 clauses and uses these clauses to provide level 88 annotations (an example of which, is explained below). As is well known to those skilled in the art, XSD is extensible in that it permits definition of annotation features, and any other tags that are used for processing instances of the schema type. This extensibility is enabled by providing references to a tag definition resource, such as a World Wide Web page, in a manner well known in the art.

Data Type Mapping

An exhaustive list of the data types of COBOL and C are provided below to complete a description of the method of mapping. Table 1 provides a list of Cobol data type mapping.

TABLE 1

| COBOL Model Types | Primitive | <restriction base=?> | more |
|---|---|---|---|
| Alphabetic | Pic A(n) | string | <length value="n"/> |
| Alphanumeric | Pic X(n) | string | <length value="n"/> |
| AlphaNumeric-EditedType | | string | <length value="n"/> |
| Numeric | S9(1)–(4) | short* | <minInclusiv |
| | S9(5)–(9) | int* | |
| | S9(10)–(18) | long* | |
| | S9(19)–(31) | BigInteger | |
| | 9(1)–(4) | Unsigned | |
| | 9(5)–(9) | unsignedInt* | |
| | 9(10)–(18) | unsignedLong* | |
| | (S)9(1)–(18) with V or P | decimal | |
| | decimal | BigDecimal | limited, may |
| | (S)9(19)–(31) | BigDecimal | |
| Internal-FloatType | COMP-1 | float | |
| | COMP-2 | double | |
| Numeric-EditedType | | string | <length value="n"/> |
| DBCSType | | string | <length value="n"/> |
| External-FloatType | | string | <length value="n"/> |
| Addressing-Type | | Not supported | |
| UnicodeType | Data stored in Unicode format-not supported | | |
| ObjectReferenceType | Not supported | | |

As will be immediately apparent to those skilled in the art, depending on the namespace assigned to the schema, the values of the restriction base and other tags may have to be prefixed with "xsd:" so that the standard xsd tag definition is applied to the schema. Tags that have values prefixed in this way are referred to a uniform resource locater that is available on the world-wide web, so that every recipient of the schema can interpret the schema definition in the same way, and verify that a given parameter constitutes an instance of the schema.

String type operators are defined in COBOL to have a specified number of characters (a length). There are many different kinds of number types in COBOL. An explicit listing of maximum and minimum values must be included, unless the size of the Cobol picture string being defined is fixed by its machine code format. For example, if a model type property of the data type is set to COMP-3, or if the compile option trun(bin) is selected and a BINARY, COMP, or COMP-4 model type property is set, the size of the picture string will be limited, and so the explicit listing of minimum and maximum values held in the picture string are not necessary.

The COBOL language supports definition of nested data structures with the use of level numbers. A level number is associated with each clause, each of which defines a respective element of the data structure. Membership is defined by clauses having a column-wise nested level. A redefines clause, as previously mentioned, permits definition of union elements.

A second example of the mapping maps primitive types of the C language to those of the XSD. While the C language is not deemed a "legacy" language by all persons skilled in the art, mostly because of its association with C++, which is at least one generation beyond COBOL, PL/I, and the like, it is considered "legacy" because it has been used to generate a lot of functionality for client/server applications that cannot run on many current computing platforms. Table 2 provides a list of C data type mapping.

TABLE 2

| C Primitive Key Word | <restriction base=?> | more |
|---|---|---|
| Wchar | string | <length value="1"/> |
| Char | string | <length value="1"/> |
| Short | short | |
| Int | int | |
| Long | int | |
| long long | long | |
| Float | float | |
| Double | double | |
| long double | double | |
| Unsigned char | unsignedByte | |
| unsigned short | unsignedShort | |
| unsigned int | unsignedInt | |
| unsigned long | unsignedLong | |
| unsigned long long | unsignedLong | |
| signed char | byte | |
| Void | Not supported | |
| * pointer | Not supported | |
| &reference | Not supported | |

The foregoing mapping is readily understood by those of skill in the art. As will also be readily apparent to those skilled in the art, the main structural key words of C are "struct" and "union". Struct permits declaration of a structure that is comprehensive of its elements, whereas union is used to declare elements/data structures having alternative type membership. Further the arrays defined in C, as are those in COBOL, treated as explained above with reference to FIG. 2.

It should be noted that simple arrays of fixed length having a base of character (char) type, are preferably mapped to strings rather than arrays of strings restricted to one element.

EXAMPLES

A few examples of COBOL and C source code, and respective output of the method of the present invention, illustrating respective aspects of the invention follow.

A first example of a data structure definition written in COBOL, defines a relatively uncomplicated data structure having three elements, a first of which is a data type, a second of which is a structure having one element. The one element is an array of fixed length. The third element comprises two variable-length array elements.

```
identification division.
  program-id. example1.
  data division.
  working-storage section.
  linkage section.
    01 COMMAREA.
      05 control1 pic 9(2).
      05 out1.
        10 field1 pic x(10) occurs 17 times.
```

-continued

```
    05 in1.
        10 team occurs 1 to 4 times depending on control1 pic
9(2).
        10 car occurs 1 to 5 times depending on control1 pic
9(2).
```

In accordance with the methods of FIGS. 2&3, the following schema definition is derived from the data structure named COMMAREA. The header of which comprises information regarding a namespace

```xml
<schema attributeFormDefault="qualified"
elementFormDefault="qualified"
targetNamespace="http://test.sample.coboloccurdependingon.cobolty
pes/url of target namespace"
xmlns="http://www.w3.org/2001/XMLSchema"
xmlns:xsd1="url of target namespace">
    <complexType name="COMMAREA">
        <sequence>
            <element name="control1">
                <simpleType>
                    <restriction base="short">
                        <minInclusive value="0"/>
                            <maxInclusive value="99"/>
                        </restriction>
                    </simpleType>
                </element>
                <group ref="xsd1:COMMAREA_out1"/>
                <group ref="xsd1:COMMAREA_in1"/>
            </sequence>
        </complexType>
        <group name="COMMAREA_out1">
            <sequence>
                <element maxOccurs="17" minOccurs="17" name="field1">
                    <annotation>
                        <appinfo source="url of tag definition resource">
                            <initialValue kind="SPACE"/>
                        </appinfo>
                    </annotation>
                    <simpleType>
                        <restriction base="string">
                            <length value="10"/>
                        </restriction>
                    </simpleType>
                </element>
            </sequence>
        </group>
        <group name="COMMAREA_in1">
            <sequence>
                <element maxOccurs="4" minOccurs="1" name="team"
type="short">
                    <annotation>
                        <appinfo source "url of tag definition resource">
                            <dependingOn>control1</dependingOn>
                        </appinfo>
                    </annotation>
                </element>
                <element maxOccurs="5" minOccurs="1" name="car"
type="short">
                    <annotation>
                        <appinfo source "url of tag definition resource">
                            <dependingOn>control1</dependingOn>
                        </appinfo>
                    </annotation>
                </element>
            </sequence>
        </group>
    </schema>
```

The namespace and application information source referred to in the schema definition are defined prior to the commencement of the method described with reference to FIG. 2. Consequently tags such as "<dependingon>" and <initialvalue kind> are defined and can be used in accordance with XSD.

The second example of a COBOL copy book is designed to show a schema generation for different possibilities as described with reference to FIG. 3. While the method of the present embodiment does not examine more than the working-storage section of a COBOL copy book, part of a procedure division is further added to illustrate how the pattern recognition description strings are chosen.

```
    identification division.
        program-id. get_customer_info.
        environment division.
        data division.
        WORKING-STORAGE SECTION.
            01 tmp pic a(40).
            01 ICOMMAREA.
                02 ICustNo PIC X(5).
                02 Ifiller PIC X(11).
            01 GENCUST.
                02 GCUSTCODE PIC X(4).
                02 GFILLER PIC X(40).
            01 PREFCUST.
                02 PCUSTCODE PIC X(4).
                02 PCUSTNO PIC X(5).
                02 ASSETS PIC S9(6)V99.
            01 REGCUST.
                02 RCUSTCODE PIC X(4).
                02 RCUSTNO PIC X(5).
                02 ACCOUNTNAME PIC A(10).
                02 BALANCE PIC S9(6)V99.
            01 BADCUST.
                02 BCUSTCODE PIC X(4).
                02 BCUSTNO PIC X(5).
                02 DAYSOVERDUE PIC X(4).
                02 AMOUNT PIC S9(6)V99.
        LINKAGE SECTION.
            01 COMMAREA.
                02 inputfield pic x(50).
        PROCEDURE DIVISION.
            start-para.
                move DFHCOMMAREA to ICOMMAREA.
                IF ICustNo EQUAL '12345'
                    move 'PREC' to PCUSTCODE
                    move ICustNo to PCUSTNO
                    move 43456.33 to ASSETS
                    move PREFCUST TO DFHCOMMAREA
                ELSE IF ICustNo EQUAL '34567'
                    move 'REGC' to RCUSTCODE
                    move ICustNo to RCUSTNO
                    move 'SAVINGS' TO ACCOUNTNAME
                    move 11456.33 to BALANCE
                    move REGCUST TO DFHCOMMAREA
                ELSE move 'BADC' to BCUSTCODE
                    move ICustNo to BCUSTNO
                    move '132' to DAYSOVERDUE
                    move -8965.33 to AMOUNT
                    move BADCUST TO DFHCOMMAREA
                * END-IF.
                END-IF.
            EXEC CICS RETURN
            END-EXEC.
```

A user who knows the source code and application of the preceding copy book, in accordance with the method shown in FIG. 3, selects the data structures that are to be alternative-type members of a schema, and names the schema "GetCustomerInfoResponseType". The user selects REGCUST, PREFCUST and BADCUST as the alternative-type members, and supplies pattern recognition description strings for each (REGC, PREC, and BADC, respectively). Further the data structure definition called ICOMMAREA is further selected for schema definition generation, and renamed "CustomerInfoInput". Consequently the following schemata are generated.

```xml
<schema attributeFormDefault="qualified"
elementFormDefault="qualified"
targetNamespace="http://cics.sample"
xmlns="http://www.w3.org/2001/XMLSchema"
xmlns:xsd1="http://cics.sample">
    <complexType name="CustomerInfoInput">
        <sequence>
            <element name="ICustNo">
                <annotation>
                    <appinfo source="url of tag definition resource">
                        <initialValue kind="SPACE"/>
                    </appinfo>
                </annotation>
                <simpleType>
                    <restriction base="string">
                        <length value="5"/>
                    </restriction>
                </simpleType>
            </element>
            <element name="Ifiller">
                <annotation>
                    <appinfo source="url of tag definition resource"
                        <initialValue kind="SPACE"/>
                    </appinfo>
                </annotation>
                <simpleType>
                    <restriction base="string">
                        <length value="11"/>
                    </restriction>
                </simpleType>
            </element>
        </sequence>
    </complexType>
    <complexType name="GetCustomerInfoResponseType">
        <annotation>
            <appinfo source="url of tag definition resource">
                <multipleOutput>true</multipleOutput>
            </appinfo>
        </annotation>
        <choice>
            <element name="Prefcust" type="xsd1:Prefcust"/>
            <element name="Regcust" type="xsd1:Regcust"/>
            <element name="Badcust" type="xsd1:Badcust"/>
        </choice>
    </complexType>
    <complexType name="Prefcust">
        <sequence>
            <element name="pcustcode">
                <annotation>
                    <appinfo source="url of tag definition resource">
                        <initialValue kind="SPACE"/>
                        <recognitionDesc pattern="PREC"/>
                    </appinfo>
                </annotation>
                <simpleType>
                    <restriction base="string">
                        <length value="4"/>
                    </restriction>
                </simpleType>
            </element>
            <element name="pcustno">
                <annotation>
                    <appinfo source="url of tag definition resource">
                        <initialValue kind="SPACE"/>
                    </appinfo>
                </annotation>
                <simpleType>
                    <restriction base="string">
                        <length value="5"/>
                    </restriction>
                </simpleType>
            </element>
            <element name="assets">
                <simpleType>
                    <restriction base="decimal">
                        <minInclusive value="-999999.99"/>
                        <maxInclusive value="999999.99"/>
                    </restriction>
                </simpleType>
            </element>
        </sequence>
    </complexType>
    <complexType name="Regcust">
        <sequence>
            <element name="rcustcode">
                <annotation>
                    <appinfo source="url of tag definition resource">
                        <initialValue kind="SPACE"/>
                        <recognitionDesc pattern="REGC"/>
                    </appinfo>
                </annotation>
                <simpleType>
                    <restriction base="string">
                        <length value="4"/>
                    </restriction>
                </simpleType>
            </element>
            <element name="rcustno">
                <annotation>
                    <appinfo source="url of tag definition resource">
                        <initialValue kind="SPACE"/>
                    </appinfo>
                </annotation>
                <simpleType>
                    <restriction base="string">
                        <length value="5"/>
                    </restriction>
                </simpleType>
            </element>
            <element name="accountname">
                <annotation>
                    <appinfo source="url of tag definition resource">
                        <initialValue kind="SPACE"/>
                    </appinfo>
                </annotation>
                <simpleType>
                    <restriction base="string">
                        <length value="10"/>
                    </restriction>
                </simpleType>
            </element>
            <element name="balance">
                <simpleType>
                    <restriction base="decimal">
                        <minInclusive value="-999999.99"/>
                        <maxInclusive value="999999.99"/>
                    </restriction>
                </simpleType>
            </element>
        </sequence>
    </complexType>
    <complexType name="Badcust">
        <sequence>
            <element name="bcustcode">
                <annotation>
                    <appinfo source="url of tag definition resource">
                        <initialValue kind="SPACE"/>
                        <recognitionDesc pattern="BADC"/>
                    </appinfo>
                </annotation>
                <simpleType>
                    <restriction base="string">
                        <length value="4"/>
                    </restriction>
                </simpleType>
            </element>
            <element name="bcustno">
                <annotation>
                    <appinfo source="url of tag definition resource">
                        <initialValue kind="SPACE"/>
                    </appinfo>
                </annotation>
                <simpleType>
                    <restriction base="string">
```

-continued
```
            <length value="5"/>
          </restriction>
        </simpleType>
      </element>
      <element name="daysoverdue">
        <annotation>
          <appinfo source="url of tag definition resource">
            <initialValue kind="SPACE"/>
          </appinfo>
        </annotation>
        <simpleType>
          <restriction base="string">
            <length value="4"/>
          </restriction>
        </simpleType>
      </element>
      <element name="amount">
        <simpleType>
          <restriction base="decimal">
            <minInclusive value="-999999.99"/>
            <maxInclusive value="999999.99"/>
          </restriction>
        </simpleType>
      </element>
    </sequence>
  </complexType>
</schema>
```

Another COBOL example illustrates how an embodiment of the method shown in FIG. 2 treats level 88 clauses, and data structures that have non-primitive bases. For brevity only a part of a data division of a COBOL copy book is included for this example.

```
01 CORP-INDEX.
   02 DEPT.
      03 deptname PIC X(20) DISPLAY.
      03 person occurs 3 TIMES.
         04 name PIC X(20) DISPLAY.
         04 age PIC 9(5) COMP.
         04 phone PIC X(8) DISPLAY.
   02 DEPT_Code PIC A(3).
      88 Ops&Products value "OAA" THRU "OZZ".
      88 Admin&BusDev value "AAA" THRU "AZZ".
      88 DesignR&D value "RDD".
```

As will be apparent to those skilled in the art, the NEW-COMMAREA data structure has two elements: DEPT and DEPT_Code, a first letter of the DEPT_Code designating a respective sector of the department. The following schemata will be generated for the CORP-INDEX data structure.

```
<schema attributeFormDefault="qualified"
elementFormDefault="qualified"
targetNamespace="http://cobol/"
xmlns="http://www.w3.org/2001/XMLSchema"
xmlns:xsd1="http://cobol/">
  <complexType name="corpindex">
    <sequence>
      <group ref="xsd1:corpindex_dept"/>
      <element name="DEPT_Code">
        <annotation>
          <appinfo source="url of tag definition resource">
            <level88>Ops&Products value OAA THRU OZZ</level88>
            <level88>Admin&BusDev value AAA THRU AZZ</level88>
            <level88>DesignR&D value RDD</level88>
            <level88></level88>
            <level88></level88>
```
          </appinfo>
        </annotation>
        <simpleType>
          <restriction base="string">
            <length value="3"/>
          </restriction>
        </simpleType>
      </element>
    </sequence>
  </complexType>
  <group name="corpindex_dept">
    <sequence>
      <element name="deptname">
        <annotation>
          <appinfo source="url to tag definition resource">
            <initialValue kind="SPACE"/>
          </appinfo>
        </annotation>
        <simpleType>
          <restriction base="string">
            <length value="20"/>
          </restriction>
        </simpleType>
      </element>
      <element maxOccurs="3" minOccurs="3" name="person" type="xsd1:CorpindexDeptPerson"/>
    </sequence>
  </group>
  <complexType name="CorpindexDeptPerson">
    <sequence>
      <group ref="xsd1:corpindex_dept_person"/>
    </sequence>
  </complexType>
  <group name="corpindex_dept_person">
    <sequence>
      <element name="name">
        <annotation>
          <appinfo source="url to tag definition resource">
            <initialValue kind="SPACE"/>
          </appinfo>
        </annotation>
        <simpleType>
          <restriction base="string">
            <length value="20"/>
          </restriction>
        </simpleType>
      </element>
      <element name="age">
        <simpleType>
          <restriction base="int">
            <minInclusive value="0"/>
            <maxInclusive value="99999"/>
          </restriction>
        </simpleType>
      </element>
      <element name="phone">
        <annotation>
          <appinfo source="url to tag definition resource">
            <initialValue kind="SPACE"/>
          </appinfo>
        </annotation>
        <simpleType>
          <restriction base="string">
            <length value="8"/>
          </restriction>
        </simpleType>
      </element>
    </sequence>
  </group>
</schema>
```

The present invention can be readily applied to COBOL, C, PL/I and high level assembler, however other similar legacy computer languages can be used to generate schemata in substantially the same manner. To demonstrate this, an example of a C-language mapping is provided. The code facilitates a transaction that registers a winner of a car.

```
include <stdio.h>
include <string.h>
include <ctype.h>
typedef struct {
        char name[30];
        char city[21];
        char phone[16];
        union {
            char coupe[20];
            char sedan[20]
        } car
} winner;
        /* Transaction entry point, to be invoked by CICS.  */
        /* No parameters.                                   */
void main( void )
{
        /* Variable to recieve response codes from service. */
        long RespCode;
        /* Declare pointer to the winner info structure.    */
        car * pCar;
        /* Get addressability to the EIB to validate the    */
        /* expected comm area length. If the comm area      */
        /* length was not of the expected length, write an  */
        /* error message to the console and exit, otherwise */
        /* get the date and time to pass back               */
        EXEC CICS ADDRESS EIB( dfheiptr );
        /* Get addressability to the comm area.             */
        EXEC CICS ADDRESS
            COMMAREA( pCar );
        /* Transaction completed, return control to system  */
        EXEC CICS RETURN;
}
Application of the method shown in FIG. 2 to the typedef of this
source code produces the following schema.
<schema attributeFormDefault="qualified"
elementFormDefault="qualified"
targetNamespace="http://c"
xmlns="http://www.w3.org/2001/XMLSchema" xmlns:xsd1="http://c">
    <group name="winner_car">
        <choice>
            <element name="Coupe">
                <simpleType>
                    <restriction base="string">
                        <length value="20"/>
                    </restriction>
                </simpleType>
            </element>
            <element name="Sedan">
                <simpleType>
                    <restriction base="string">
                        <length value="20"/>
                    </restriction>
                </simpleType>
            </element>
        </choice>
    </group>
    <complexType name="winner">
        <sequence>
            <element name="name">
                <simpleType>
                    <restriction base="string">
                        <length value="30"/>
                    </restriction>
                </simpleType>
            </element>
            <element name="city">
                <simpleType>
                    <restriction base="string">
                        <length value="21"/>
                    </restriction>
                </simpleType>
            </element>
            <element name="phone">
                <simpleType>
                    <restriction base="string">
                        <length value="16"/>
                    </restriction>
                </simpleType>
            </element>
            <group ref="xsd1:winner_car"/>
        </sequence>
    </complexType>
</schema>
```

As will be evident to those skilled in the art, the present invention may be practiced using other markup languages and other schema definition languages. To create XSD schema definitions requires proper use of namespace references and header information, which is well documented and known in the art.

As will also be evident to those skilled in the art, there are numerous applications of schema definitions generated in a standard manner in a language- and environment-neutral format such as XSD. One emerging demand for these schemata is in web service description language (WSDL) web service definitions, which are known in the art.

The embodiment(s) of the invention described above are therefore intended to be exemplary only, the scope of the invention is intended to be limited solely by the scope of the appended claims.

We claim:

1. A method in a data processing system for generating a schema definition from a nested data structure definition defined in a legacy computer language, comprising:

identifying a plurality of identified data structures by scanning a source code stored in a computer-readable storage medium, wherein the source code is written in a legacy computer language;

selecting via a Graphical User Interface (GUI) a nested data structure from the plurality of identified data structures;

receiving a language-specific metamodel generated from the nested data structure definition written in the legacy computer language;

naming and defining a first complex type schema element for the nested data structure, wherein naming and defining comprises setting a content model of the first complex type schema element to sequence; and creating the schema definition by walking through the language-specific metamodel to examine each node in a plurality of nodes of the language-specific metamodel, and for each node, creating a respective schema element according to a predefined mapped relationship, wherein creating the schema definition further comprises populating a schema tree; and serializing the schema tree after it is populated.

2. A method as claimed in claim 1 wherein receiving comprises receiving a parse tree generated from the nested data structure definition written in one of C, PL/I, high level assembler and Cobol.

3. A method as claimed in claim 1 wherein populating the schema tree comprises:

selecting a first node from the plurality of nodes in the walk through the language-specific metamodel, in accordance with a breadth-first selection algorithm;

examining the respective schema element of the first node to determine a type of the elements, the type of the elements determined being a determined element type; and applying the predefined mapped relationship to the first node in accordance with the determined element type to generate the respective schema element.

4. A method as claimed in claim 3 wherein applying the predefined mapped relationship comprises:
generating the respective schema element by creating a first object of a type determined by the predefined mapped relationship, the type of the object determined being a determined object type;
specifying a first name for the first object; and setting all required attributes of the first object according to the determined object type.

5. A method as claimed in claim 4 wherein specifying the name for the first object comprises deriving the name for the first object from a list of names of the first node, and ancestors of the first node, in accordance with a naming convention.

6. A method as claimed in claim 4 wherein generating the schema element comprises creating one of: a group schema element; a simple type schema element, and a second complex type schema element, in dependence upon the determined object type and the determined element type.

7. A method as claimed in claim 4 wherein examining comprises determining if the first node comprises at least one union element and, if the first node comprises at least one union element, then the step of applying the predefined mapped relationship comprises:
generating a group schema element by creating the first object, wherein the first object is a child of the respective schema element, the first object being a group schema element of choice composition kind; and
for each additional union element, creating a respective additional object, wherein the respective additional object is a child of the additional union element.

8. A method as claimed in claim 4 wherein examining comprises determining if the first node is an array and, if the first node is an array, then the step of applying the predefined mapping comprises:
creating the first object, wherein the determined object type is a simple type object;
setting the first name of the first object;
setting a minimum number of fields in the array and a maximum number of fields in the array;
setting a name of the fields in the array; and
setting the type of the fields in the array.

9. A method as claimed in claim 8 wherein setting the minimum number of fields in the array and the maximum number of fields in the array comprises determining if the array is of a fixed-length or a variable-length, and setting the minimum number of fields in the array and the maximum number of fields in the array accordingly.

10. A method as claimed in claim 8 wherein setting the type of the fields in the array further comprises determining if the fields in the array are non-primitive and, if the in the array are non-primitive, then creating the first object, wherein the determined object type is a complex type object that is a child of a root of the schema tree, and setting the content model to sequence.

11. A method as claimed in claim 5 wherein setting all the required attributes comprises:
if the schema element is the second complex type schema element or the group schema element, setting a second content model to sequence or choice for the schema element; and
if the schema element is the simple type schema element, setting a data type for the schema element.

12. A method as claimed in claim 11 wherein setting the data type comprises applying a mapping from a language-specific data type to a schema data type.

13. A method as claimed in claim 12 wherein setting the data type further comprises setting optional parameters that apply restrictions on the simple type schema element in accordance with a native interpretation of the first node.

14. A method as claimed in claim 12 wherein setting data type further comprises enclosing an annotation to supply an expected value, an initial value, or a default value for the node, in accordance with a native interpretation of the first node.

15. A method as claimed in claim 11 wherein receiving further comprises receiving the language-specific metamodel containing parts generated from the plurality of nested data structures, and each of these parts, in turn is used to create a respective schema sub-tree having a complex type root that is a child of a root of the schema tree.

16. A method as claimed in claim 15 further comprising:
receiving user input prior to the steps of naming and defining the complex type schema element for the nested data structure, wherein the user input comprises:
supplying a user-defined name the respective schema sub-tree that replaces a default name for the first complex type schema element that serves as a root of the respective schema sub-tree;
supplying a list of the parts that are to be used to create the respective schema sub-tree; and
requesting a grouping of the parts to form a user-structured schema.

17. A method as claimed in claim 16 wherein receiving user input further comprises receiving a request for a grouping of possible outputs from a system corresponding to the plurality of nested data structures defined by respective parts identified by the user, the method further comprising:
creating a child object of the root of the schema tree to serve as a root of the respective schema sub-tree;
settling the name of the child object to a user-supplied name for the grouping;
setting a content model of the child object to choice; and
for the respective schema sub-tree defined for the respective identified parts, inserting an annotation into a first data type element, the annotation including a pattern recognition description that uniquely identifies the possible output.

* * * * *